(No Model.)
C. ROUGET.
SHIP'S COURSE CORRECTOR.
No. 368,973. Patented Aug. 30, 1887.
Fig. I.
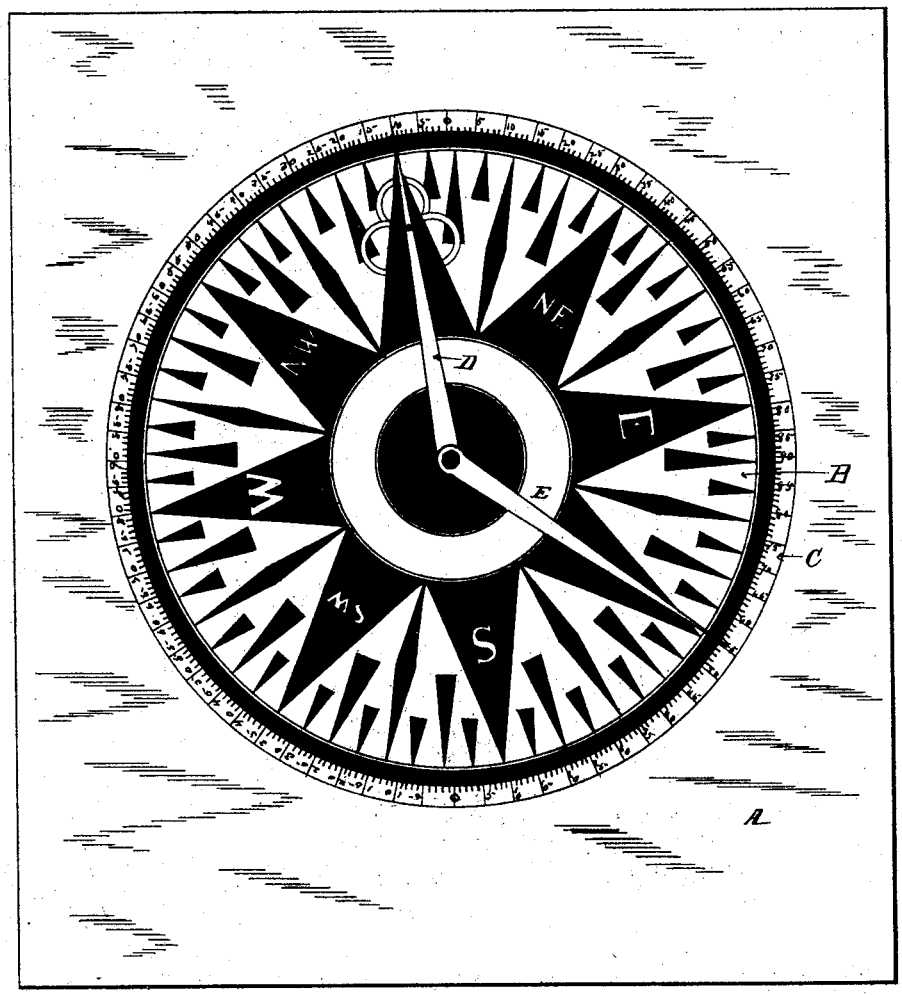
Fig. II.
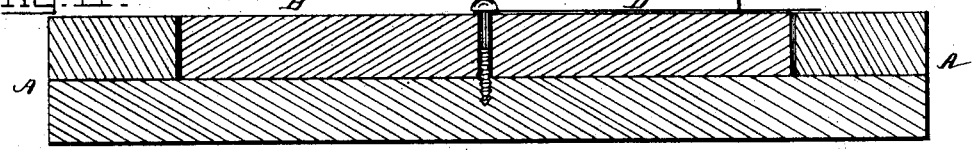
Witnesses
Inventor
Charles Rouget
By his Attorney

UNITED STATES PATENT OFFICE.

CHARLES ROUGET, OF SAN FRANCISCO, CALIFORNIA, ASSIGNOR OF ONE-HALF TO E. P. VOISARD, OF SAME PLACE.

SHIP'S COURSE CORRECTOR.

SPECIFICATION forming part of Letters Patent No. 368,973, dated August 30, 1887.

Application filed October 21, 1886. Serial No. 216,914. (No model.)

*To all whom it may concern:*

Be it known that I, CHARLES ROUGET, a citizen of the United States, and a resident of San Francisco, county of San Francisco, and State of California, have invented certain new and useful Improvements in Marine Correctors, of which the following is a specification.

The object of my invention is to produce an instrument to be used by mariners having nautical calculations to make, by means of which a great saving of time and labor is effected.

The use of my instrument prevents all possible errors in correcting courses and bearings from the compass's courses to the true ones, and vice versa. It aids in defining the nautical point, as the compass's courses carried on the log-book are immediately corrected and reduced to degrees as they should be entered on the tables.

The accompanying drawings illustrate what I consider the best means for carrying my invention into practice.

Figure I is a plan view of the device. Fig. II is a central section thereof taken vertically through the same.

Similar letters of reference indicate corresponding parts.

A represents a block of wood, metal, or other material, which will serve as a base or foundation for my nautical instrument. Usually a board or block of wood about a foot square and about an inch thick is sufficient. In the upper face of the board or base I make a circular depression in which a compass-card, B, will fit, so that the upper face of the card is flush with the surface of the board or base. This card is provided with compass-points on its upper face in the same manner as the ordinary compass-card, and it is pivoted at its center, so that it can be rotated freely in its recess. Around the edge of the circular recess in the board or base A, I provide a graduated circle, C, the graduations of which are laid off in degrees. These degrees are marked off in four quarters from zero to 90°, one zero being north and the other south.

The compass-card B is provided with a fixed index-finger, D, which can be adjusted by rotating the card B to indicate any point on the graduated circle C.

A movable index-finger or pointer, E, is pivoted to the center of the card B, so that it can be swung around on its pivot independent of the card B, and be made to indicate any point on the graduated circle.

In using this instrument the compass-card B is adjusted so that its fixed index-finger D shall indicate and allow for the magnetic variation—as, for instance, if the variation of the magnetic needle is five degrees east of the meridian the fixed index-finger will be turned with its card five degrees west of the north zero point on the graduated circle C. Then the movable pointer B is turned to indicate any other point on the circle C which it may be desired to make calculations with reference to.

The movable dial being fixed as above described, the following calculations can be made:

First. To correct the course of the compass to the true course, place the movable pointer on the point of the movable dial corresponding to the point the ship is steering by and note the number of degrees on the graduated circle N. (north) or S. (south) toward the E. (east) or W., (west.) This indicates the true course, (making allowance for currents.)

Second. To find a true course corresponding to one taken from a map, place the movable pointer on the degree of graduation of the circle C corresponding to the true course and read on the dial the point under the movable pointer, (allowing for currents.)

Third. To determine the position of a ship on a map from bearings taken from two known given points, or correct the compass bearing to a true one, place the movable pointer on the point of the dial corresponding to the bearings and read on the graduated circle the point indicated by the movable pointer which indicated the true bearings. Having done so for both bearings, mark them on the map. The intersection of the two lines will be the exact position of the ship.

Fourth. To record the nautical points of the courses on the log-book, place the movable pointer on the points of the dial corresponding with the different routes followed during the day, read on the circle the number of degrees of each indication, taking the angle of degrees and the number of miles traveled, and you find the distances covered N. (north) or S. (south) on the one hand, and the distances covered E. (east) or W. (west) on the other.

Fifth. To indicate the variation and its denomination N. E. (northeast) or N. W. (northwest), find both azimuths, either by calculation or from observations, for the true one, and by the compass's bearings for the magnetic, place the fixed index-finger on the N. (north) point corresponding to zero variation, then move the movable pointer until the point reaches the graduation equal to the true azimuth. The angle formed by the magnetic azimuth and the movable pointer is equal to the variation N. E. (northeast) if the needle bears to the left, and N. W. (northwest) if it bears to the right.

Having thus described my invention, what I claim, and desire to secure by Letters Patent, is—

A nautical instrument consisting of the base or board A, provided with a graduated circle, C, and having the compass-card B mounted inside the circle, so that it can be rotated freely, said compass having a fixed index-finger, D, and a movable pointer, E, combined and operated substantially as described.

CHARLES ROUGET.

Witnesses:
CHARLES GEORGE SAPIN,
EMILE P. VOISARD.